ically cited for improving impact strength of steels in general, the phenomenon of using these elements for improving the impact strength of welds is not.

United States Patent [19]
Chai et al.

[11] Patent Number: 4,717,536
[45] Date of Patent: Jan. 5, 1988

[54] WELD BEAD ELECTRODE FOR PRODUCING SAME AND METHOD OF USE

[75] Inventors: Chang-Shung Chai, South Euclid; Jon McCollister, Mentor, both of Ohio

[73] Assignee: The Lincoln Electric Company, Cleveland, Ohio

[21] Appl. No.: 822,273

[22] Filed: Jan. 24, 1986

[51] Int. Cl.$^4$ .................... C22C 38/28; B23K 35/368
[52] U.S. Cl. ........................ 420/103; 148/24; 219/137 WM; 219/145.22; 219/146.23/146.24; 219/146.41; 420/104; 420/126; 420/128
[58] Field of Search ............... 75/124, 126 D, 126 J, 75/128 T, 128 N; 148/24; 219/137 WM, 145.22, 146.23, 146.24, 146.41; 228/263.15; 420/103, 104, 126, 128

[56] References Cited

U.S. PATENT DOCUMENTS

3,162,751  12/1964  Robbins ..................... 219/146.23

FOREIGN PATENT DOCUMENTS

157594  9/1983  Japan ............................. 219/146.23

OTHER PUBLICATIONS

Tamehiro et al., "Austenite Grain Size of Titanium-Microalloyed Continuously Cast Steel Slabs", Transactions ISIJ, vol. 25, 1985.
Nishio et al., "Effects of Ti and N on Notch Toughness of Synthetic Weld Heat Affected Zone", Transactions of the Japanese Welding Society, vol. 15, No. 2, Oct. 1984, pp. 40–48.

*Primary Examiner*—L. Dewayne Rutledge
*Assistant Examiner*—Robert L. McDowell
*Attorney, Agent, or Firm*—Body, Vickers & Daniels

[57] ABSTRACT

Weld bead analysis and electrode capable of producing same, which in multiple pass welding of thick steel plates, results in fine grain structure and high impact strength. The analysis includes as necessary ingredients, titanium, nitrogen and chromium with a maximum limitation on aluminum, if present. The electrode contains titanium and chromium. The welding is in air and the titanium picks up nitrogen from the air and carries it into the weld bead as micro particulates of titanium nitride, which forms nucleation points for commencing fine grain growth.

8 Claims, No Drawings

WELD BEAD ELECTRODE FOR PRODUCING SAME AND METHOD OF USE

This invention pertains to the art of welding and, more particularly, to a weld bead analysis produced by welding and an electrode capable of producing the desired weld bead analysis.

The invention is particularly applicable to electric arc butt welding of relatively thick low carbon (and for some low alloy) steel plates and will be described with particular reference thereto, although it will be appreciated that the invention has broader applications and may be used wherever steel having high impact values is required.

The various essential elements of a weld bead analysis (in addition to iron) may be supplied to the molten weld pool in various ways, but the invention is particularly applicable to the use of a bare tubular steel wire having in the core, fluxing ingredients including the various elements necessary to affect the desired weld bead analysis and will be described with particular reference thereto, although it will be appreciated that these elements could be included in a flux coating on a solid wire, or in a granular flux to be deposited over the weld bead or alloyed with the steel of the electrode wire. It will also be appreciated that the elements to be added can be present as metals, alloys, and/or compounds in combination with suitable reducing agents.

BACKGROUND

In the welding industry, a principal characteristic desired or demanded of weld beads is high tensile strength and ductility, coupled with a toughness as measured by the well known Charpy V-Notch Impact Test and now more recently by a Crack Tip Opening Displacement (CTOD) test. In the Charpy Test, a chilled specimen of prescribed dimensions is placed in a test machine and the energy required to fracture the specimen on impact is then measured. In the CTOD test, a fatigue crack is developed, then the specimen is subjected to stress until it breaks. The higher the energy or CTOD value, the better the weld. Only the Charpy test will be referred to hereinafter.

In the welding of heavy steel plates, it is conventional to cut samples from the top, bottom and middle of a sample weld, and to measure the impact strength of each of these sections.

In the welding of heavy steel plates, on the order of one and one-half to two inches and more, it is conventional to: bevel the edges of the plates; place the sharp edges thus formed in close spaced relationship; weld the root together; and then with a series of overlapping arc weld passes, fill up the V-notch formed by the bevelled edges. In such an operation, each successive weld pass partially melts the previously deposited weld bead and reheats the metal adjacent to the re-melted metal to a temperature above its transformation temperature.

In such multiple pass welding, heretofore using the same electrode, it has been difficult to obtain Charpy Impact values over the entire depth of the weld which were acceptable to industry.

The desired result has been accomplished by changing the electrode employed for successive passes, but this makes the operation complicated, time-consuming, and expensive. The present invention obtains the high Charpy Impact Test values required using a single electrode.

Another problem has been that in order to obtain the high impact strengths desired in multi-pass welding, it has been necessary to impose limitations on the size of the weld deposit which could be laid down in each pass or layer. The size of the weld deposit is determined by the electrode size, the electrode feed speed, and the travel speed. Thus, by limiting the size of each deposit, a greater number of passes were required to fill the joint, which resulted in a longer time to complete the total weld.

Correlative to this, was that the welding parameters had to be established and the welding operator made to comply to these parameters. If he exceeded them, weld beads which did not have the desired Charpy Impact strength resulted.

Using the present invention, the number of passes is substantially reduced and there is no limit on the size of each layer.

Another problem, because of the limitation on the thickness of each deposit laid down, was that the operators were required, when welding vertically extending butt joints, to weld from the top down. Using the present invention, it is now possible to obtain weld beads having the desired impact strengths by welding vertically up, a less costly procedure.

A still further problem has been variation in the impact strength from the root to the cap on the weld bead. This may be explained by the fact that electrodes normally include titanium in some form in the flux, which titanium ends up as a residual in the weld bead. Some titanium is necessary to provide the desired impact values. However, titanium in excessive amounts is detrimental to the impact value.

As a result, the electrode had to contain enough titanium so that in the root pass(when there is substantial dilution of the electrode metal by the metal of the workpiece which melts and becomes part of the weld bead), there will be sufficient titanium to provide the desired impact value. However, as the subsequent layers are deposited, there is less and less dilution from the metal of the workpiece and, ultimately, the amount of titanium in the weld bead reaches a value where the impact value begins to decrease. Also, the final or capping layer is never reheated as with the root pass or intermediate passes and thus does not receive the grain refining effects of this reheating. Thus, the weld bead analysis of this final capping pass is important.

As will appear using the present invention, there is an increase in the titanium residual in the weld bead, but the maximum value reached is less than the critical value where impact values begin to decrease with increased titanium content. Also, titanium content in the final or capping pass is low enough as not to require any grain refinement by reheating.

In the past, in the arc welding of steel, fluxes have been used either on the inside of a tube, coated on an electrode wire, or as a pile of granular flux on the weld bead, for various purposes including: (1) to add alloying elements to the weld bead, but (2) first and foremost, to exclude or limit nitrogen from the metals transferring from the electrode wire to the weld pool or from the weld pool itself. At the temperature of the arc, molecular nitrogen from the atmosphere tends to decompose and is carried into the molten weld puddle. Then, as the weld puddle cools, the atomic nitrogen returns to the molecular form and is released as nitrogen gas within the weld bead resulting in porosity and a defective weld bead.

Thus, using a bare steel wire and no shielding gas, the fluxing ingredients always included compounds which would vaporize in the heat of the arc to exclude nitrogen from the vicinity of the arc. In the alternative, shielding gases coaxial with the electrode wire and the arc, were employed to exclude nitrogen. Granular flux deposited on top of the weld bead through which a bare electrode wire is advanced, has also been employed.

As will appear, to some extent the present invention reverses this objective of the prior art, and makes beneficial use of small amounts of nitrogen in the weld metal but as a compound of titanium.

THE INVENTION

Thus, the present invention contemplates a new and improved weld bead analysis which inherently has a high Charpy Impact value, which can be deposited in multiple layers in multi-pass electric arc welding and which overcomes the problems of the prior art above enumerated and others.

In accordance with its broadest aspect, the invention contemplates a low carbon weld bead deposit having sufficient but controlled amounts of micro particulates of titanium nitride dispersed throughout so as to form nucleation seeds around which the grain growth can begin to form as the steel solidifies and cools, the result being a very fine grain structure of the steel which has a high Charpy Impact value.

Further in the broad aspect of the invention, controlled amounts of chromium are included in the analysis while at the same time limiting the maximum amount of aluminum.

It is to be noted here that titanium and/or aluminum are conventional weld bead ingredients, the novelty being the use of chromium which both lowers the transformation temperature of the weld metal and acts as a catalyst to promote the formation of titanium nitride.

Still more specifically in accordance with the invention, a weld bead analysis is provided comprised of: a low carbon steel containing as essential ingredients and in closely controlled amounts, titanium from 0.03% to 0.12%, nitrogen from 0.01% to 0.04%, plus chromium from 0.05% to 0.3% and aluminum, if present, in amounts not to exceed 0.95%, all weights herein being expressed as a percent of the total weld bead sample tested.

Still more specifically in accordance with the invention, a weld bead analysis is provided wherein the principal alloying ingredients are as follows in weight percent:

Titanium: 0.03–0.12
Nitrogen: 0.01–0.04
Chromium: 0.05–0.30
Aluminum: Less than 0.95
Zirconium: Less than 0.05
Carbon: 0.04–0.15
The ingredients may also include:
Nickel: 0.3–1.5
Manganese: Less than 1.6
Silicon: Less than 0.30
Sulphur, Oxygen and Phosphorus: Less than 0.01

The nitrogen is present as titanium nitride which has a very high (compared to steel's 1535° C. (2777° F.) melting temperature of 2930° C. (5306° F.) and is present as very finely divided- or micro particulates in the hardened weld bead. Each particulate forms a nucleation point around which grain growth commences as the steel congeals and cools through its solidification temperature. Because of these many nucleation points, a very fine grained micro structure results. The titanium nitride may also be described as functioning as an austenite grain inhibitor.

The addition of titanium or chromium to the weld bead is not difficult. Either can be an ingredient in the flux in the core of a tubular wire, or in the coating on the outside of a solid electrode wire, in both cases, either as a metal, or alloy, or as a compound in combination with certain known reducing agents, such as magnesium and/or aluminum; or alloyed with the steel of the electrode wires.

It is possible to add the titanium nitride to the weld bead by using titanium nitride as one of the ingredients in the flux, whether coated on the outside of a solid steel wire or on the inside of a tubular wire or in a granular flux. Titanium nitride, however, is very expensive and it is preferred to use other cheaper ways of providing the titanium nitride in the weld bead.

In one possibility (not investigated), the titanium nitride could be included as an ingredient in the steel of the electrode wire.

Preferably, and in accordance with the invention, the titanium nitride is introduced into the weld by providing: in the core of a tubular electrode appropriate amounts of titanium and chromium, either as metals, alloys, or oxygen compounds in combination with a suitable reducing agent in an appropriate amount, and welding so that the nitrogen of the air is not excluded from the arc and the titanium combines with the nitrogen of the surrounding atmosphere to form titanium nitride, which is carried into the weld pool in the required amounts in a precipitate form, i.e., microscopic particulates.

That this exposure to the nitrogen of the air is important is indicated by tests wherein the same electrode used in argon shielding gas produced poor impact strengths.

It will also be appreciated that the oxygen of the air must be prevented from being carried into the weld pool and this is done by including aluminum and/or magnesium, either as a metal or alloy in the core of the tubular steel wire, which aluminum and/or magnesium reacts with the oxygen of the atmosphere to form an oxide which forms part of the slag and can be disposed of when the welding is completed.

When aluminum is used as a deoxidizer, it must always be used in amounts in excess of the amount that will react with the oxygen, with the result that some of the aluminum does not react and transfers to the weld bead and shows up as a residual. Aluminum in too large quantities in the weld bead has a detrimental effect on the impact strength and in accordance with the invention, is present in the electrode in an amount such that, (considering the residual amount that is not converted to aluminum oxide by the oxygen in the air or oxygen taken from the other compounds of the flux and thus transfers to the weld bead as a residual) the residual aluminum in the weld bead is always less than 0.95 percent.

To reduce the amount of aluminum required to completely deoxidize the weld metal, magnesium is substituted either as a metal or as an alloy with the aluminum. Magnesium, having a lower boiling temperature than the solidifying temperature of the steel does not alloy with the steel.

Chromium has always been considered detrimental to impact strength, otherwise known as notch toughness and has normally been excluded from weld bead analyses. Thus, chromium increased the strength of the steel, but lowered its impact strength. Applicant believes that this is the first time that chromium has been known to increase the impact strength.

Chromium is added to the electrode as a catalyst to increase the formation of titanium nitride. This insures the necessary amount of titanium nitride in the weld metal and helps to prevent the titanium content from building up in multiple-pass welding. Thus, its normal detriments to impact strength are offset by the reduction in the amount of titanium required, and the increase in the titanium nitride particulate. Tests have shown that the presence of chromium has no effect on the fine grain microstructure which the present invention provides.

In general, it may be stated that, with the exception of chromium, the above general formulation for the flux ingredients was known. The novelty is the addition of chromium to the flux formulation which serves as a catalyst in the combining of the titanium and nitrogen in the heat of the arc. This titanium nitride is then carried into the weld pool as a plurality of finely dispersed micro molecular particulates providing multiple nucleation points where individual grain growth starts and continues as the steel solidifies and then cools through the transformation temperature.

The chromium also acts to lower the transformation temperature of the weld bead. Because of this, more of each previously deposited layer is grain refined in subsequent passes, making it possible to lay down a larger amount of metal in each pass and thus decreasing the number of passes to fill up a given weld gap. By decreasing the number of passes, the total time required to complete a given weld is substantially decreased.

Furthermore, by being able to use the same electrode for the root pass, the middle passes, and the cap pass of the weld bead, considerable time is saved in not having to change the welding electrode as was heretofore the case in installations which required the highest impact strength throughout the entire weld bead.

A further interesting feature of the invention is that photo micrographs of the bead cross section do not clearly show any lines of demarcation between adjacent layers such as has been the case with previous multipass weld beads not using the present invention.

It is believed that I am the first to have recognized the advantages, in the depositing of electric arc weld beads, to have widely dispersed micro particulates of titanium nitride and of the value of chromium as a catalyst to cause the titanium and nitrogen to combine as a compound which would enter the molten weld pool and become a solid well above the melting temperature of steel, and thus function as a nucleation point for the simultaneous starting of crystal growth generally throughout the entire weld bead. By promoting this fine grained microstructure, I have been able to consistently obtain high impact values for arc welded deposited steels.

OBJECTS

The principal object of the present invention is the provision of a new and improved weld bead analysis which meets stringent impact and CTOD requirements for joining low carbon and/or some low alloy steels.

Another object of the invention is the provision of a weld bead analysis and an electrode for producing same which enables the ready welding of circumferential groove welds for heavy wall, large diameter tubular construction or general plate fabrication.

Another object of the invention is the provision of a new and improved electrode which enables welding in a vertical up, vertical down, overhead or downhand position.

A further object of the invention is the provision of a weld bead analysis and electrode for producing same which has good mechanical properties with large beads and/or thick layers.

A further object of the invention is the provision of a new and improved weld bead analysis, and electrode for producing same which provides excellent notch toughness regardless of notch location in the weld metal nugget.

Another object of the invention is the provision of a new and improved tubular electrode which enables the welding of high quality, high impact strength weld beads without the need for externally supplied shielding gases and which enables depositing thicker layers of weld metal in each pass.

Another object of the invention is the provision of a new and improved welding electrode for multi-pass welding on relatively thick steel plate, wherein relatively high impact values are obtained over the entire depth of the weld bead.

A further object of the invention is the provision of a new and improved electrode wherein a given size notch formed by the edges of plates to be butt welded can be filled with weld metal with fewer number of passes while still providing high impact values over the entire weld bead.

A further object of the invention is the provision of a new and improved electrode for multi-pass welding wherein the amount of metal deposited in each pass is not critical to the impact value of the ultimate weld.

Another object is the provision of a weld bead analysis which does not require reheating by subsequent welding passes to obtain high impact values.

A further object of the invention is the provision of a new and improved weld bead analysis which contains controlled amounts of nitrogen, titanium, chromium and aluminum.

A further object of the invention is the provision of a new and improved weld bead analysis wherein nitrogen is included as a necessary ingredient in the weld bead.

A further object of the invention is the provision of a new and improved weld bead analysis includes titanium nitride and chromium for the purpose of creating a refined grain microstructure.

Another object of the invention is the provision of a new and improved weld bead analysis and welding electrode wherein the conveying of nitrogen into the weld bead is not detrimental to the quality of the strength of the weld bead.

PREFERRED EMBODIMENT

The invention may take physical form in the chemical analysis of the weld bead between two steel plates and in the electrode capable of laying down a weld bead with such analysis.

In a preferred embodiment, the weld bead is laid down between two one and one-half inch (3.85 cm) thick A 537 steel plates with the edges of the plates bevelled to provide a 45° included angle and the plates positioned so that the lower sharper edges are spaced 3/16 of an inch (0.47 cm). The plates are preheated to 200° F. (79° C.) and between each weld pass the temperature of the previously deposited bead is allowed to decrease to approximately 200° F. (79° C.).

In fifteen passes using electrodes A and B described below, the following impact values were obtained:

|  |  | Impact at −40° F. (ft-lbs) (× 1.3 for cm-Kg) |
|---|---|---|
| Example A | Cap | 75, 69, 110, 158 |
|  | Middle | 124, 110, 122, 116, 118 |
|  | Root | 43, 71, 83, 69 |
| Example B | Cap | 82, 87, 81, 112 |
|  | Middle | 117, 138, 132, 135 |
|  | Root | 57, 108, 90, 85 |

Typical analysis for the Example A was as follows:

|  | C | Mn | Si | Al | N | Cr | Ti | Zr | Ni | S | P | O |
|---|---|---|---|---|---|---|---|---|---|---|---|---|
| Cap | .056 | .81 | .05 | .80 | .036 | .10 | .053 | .032 | .59 | .003 | .004 | <.01 |
| Mid | .067 | .82 | .05 | .76 | .030 | .10 | .059 | .039 | .56 | .003 | .004 | <.01 |
| Root | .093 | .89 | .07 | .62 | .032 | .09 | .048 | .030 | .51 | .003 | .004 | <.01 |

In a second test, under similar conditions but using only eight passes to fill the gap, the following impact values were obtained:

|  |  | Impact at −40° F. (ft-lbs) |
|---|---|---|
| Example A | Cap | 118, 122, 192, 138 |
|  | Middle | 95, 101, 108, 120 |
|  | Root | 40, 67, 38, 54 |
| Example B | Cap | 64, 88, 100, 87 |
|  | Root | 77, 96, 111, 98, 76 |

Typical analysis for Example B was as follows:

|  | C | Mn | Si | Al | N | Cr | Ti | Zr | Ni | S | P | O |
|---|---|---|---|---|---|---|---|---|---|---|---|---|
| Cap | .041 | .83 | .18 | .78 | .036 | .15 | .066 | .036 | .85 | .003 | .004 | <.01 |
| Mid | .046 | .84 | .20 | .73 | .033 | .14 | .060 | .032 | .79 | .003 | .004 | <.01 |
| Root | .065 | .93 | .21 | .66 | .034 | .16 | .046 | .023 | .73 | .003 | .004 | <.01 |

These test specimens were obtained using one of the following electrodes where steel is in the form of a low carbon steel tube and the core of the tube was filled with flux ingredients as follows (in weight percent):

|  | A | B | C |
|---|---|---|---|
| $Li_2O$ | 0.28 | 0.28 | — |
| $SiO_2$ | 0.39 | 0.40 | — |
| CaO | 0.29 | 0.29 | — |
| $Fe_2O_3$ | 3.24 | 3.24 | 3.52 |
| BaO | 1.69 | 1.97 | — |
| $TiO_2$ | — | 0.16 | — |
| SrO | — | — | 1.34 |
| $BaF_2$ | 8.44 | 8.44 | 10.02 |
| Other fluorides, e.g., Li, Si, K, Sr | 1.35 | 1.35 | 1.68 |
| Mg | 1.33 | 1.19 | 1.38 |
| Al | 1.72 | 1.54 | 1.70 |
| Ti | 0.07 | — | 0.10 |
| Mn | 0.43 | 0.45 | 0.47 |
| Ni | 0.75 | 0.75 | 0.58 |
| Zr | 0.12 | 0.12 | — |
| Cr | 0.16 | 0.16 | 0.10 |
| Fe | Bal. | Bal. | Bal. |

Typical welding parameters with the above electrodes are:
a. electrode 5/64 of an inch in diameter,
b. DC electrode negative polarity; and,
c. ¾ inch electrical stickout.

| Arc Voltage | Wire Feed Speed Inches/Min. | Approximate Current Amps | Weld Metal Deposit Rate in lbs/hr |
|---|---|---|---|
| 19–20 | 90 | 225 | 4.1 |
| 17–18 | 70 | 175 | 3.1 |

The invention has been described with reference to preferred embodiments. The principal novelty is the encouragement of the production in the arc of high melting temperature titanium nitride particulates which can form multiple nucleation points dispersed throughout the congealing and cooling weld metal from which the necessary small crystal configuration for high impact value results. Obviously modifications and alterations will occur to others upon a reading and understanding of this specification and it is my intention to include all such modifications and alterations insofar as they are included within the scope of the approved claims.

Having described my invention, I claim:

1. An electric arc deposited weld bead having the following essential analysis in weight percent of total weight of a weld bead sample:
   Ti: 0.03 to 0.12
   N: 0.01 to 0.04
   Cr: 0.05 to 0.30
   Al: less than 0.95
   the remainder being essentially iron.

2. The weld bead of claim 1, including in addition the following alloying ingredients:
   Zr: less than 0.05
   Ni: 0.3–1.5
   C: 0.04–0.15
   Mn: less than 1.6
   Si: less than 0.30
   O: <.01
   P: <.01
   S: <.01

3. A method of electric arc welding comprising the steps of:
   a. providing a steel wire electrode having:
   (1) steel alloying elements selected from the group consisting of Ti, Zr, Ni, C, Mn, and Si, either as elements, metals, alloys or compounds;
   (2) flux ingredients selected from the group consisting of the fluoride of lithium, barium, silicon, strontium, calcium and potassium and the oxides of iron, lithium, calcium, barium;
   (3) reducing agents selected from the group consisting of magnesium, aluminum, and silicon;

(4) the titanium, chromium and aluminum being essential ingredients and always present in amounts that, considering the chemical reactions in the arc, the titanium, chromium and aluminum will be present in the weld bead in the following amounts (expressed as a percent of the bead sample):
Titanium: 0.03 to 0.12
Aluminum: less than 0.95
Chromium: 0.05 to 0.30
and, b. establishing an electric arc between the end of such electrode and a a steel workpiece without shielding the arc electrode or weld pool from the atmosphere whereby the titanium picks up and carries into the weld bead nitrogen from the air in the amount of 0.01 to 0.04.

4. An electric arc welding electrode for welding steel in air comprised of a steel wire having:
   a. alloying ingredients either as an element, a metal, an alloy, or a compound, selected from the group consisting of titanium, chromium, aluminum, carbon, zirconium, manganese, silicon, nickel;
   b. reducing agents selected from the group consisting of magnesium, aluminum and silicon, either as a metal or alloy;
   c. fluxing agents selected from the group consisting of the flourides of barium, lithium, calcium, potassium, silicon, strontium, and the oxides of lithium, silicon, iron, barium, strontium, calcium;
   d. titanium, chromium and aluminum always being present as essential ingredients in such amounts that considering the chemical reactions in the arc while welding in air, the following ingredients will appear in the weld bead (expressed as a percent of the total bead sample):
   Titanium: 0.03 to 0.12
   Nitorgen: 0.01 to 0.04
   Aluminum: less than 0.95
   Chromium: 0.05 to 0.30
   the balance being essentially iron.

5. An electric arc welding electrode for welding steel in air comprised of a steel wire having titanium, chromium and aluminum in such amounts that when welding low carbon steel in air the weld bead has the following analysis in weight percent of the weld bead:
Ti: 0.03 to 0.12
N: 0.01 to 0.04
Cr: 0.05 to 0 30
Al: nor more than 0.95%
the nitrogen being present as dispersed micro particulates of TiN; the balance being essentially iron.

6. An electric arc welding electrode for welding steel in air comprised of a tube of steel having the following ingredients in the core thereof (in weight percent of total electrode weight):
$Li_2O$: 0.28
$SiO_2$: 0.39
GaO: 0.29
$Fe_2O_3$: 3.24
BaO: 1.69
$BaF_2$: 8.44
at least one or more additional metal Fluorides selected from the class consisting of Li, Si, K, Sr 1.35
Mg: 1.33
Al: 1.72
Ti: 0.07
Mn: 0.43
Ni: 0.75
Zr: 0.12
Cr: 0.16
Fe: Balance 7. An electric arc welding electrode comprised of a tube of steel having the following ingredients in core thereof (in weight percent of total electrode weight):
$Li_2O$: 0.28
$SiO_2$: 0.40
CaO: 0.29
$Fe_2O_3$: 3.24
BaO: 1.97
$TiO2$: 0.16
$BaF_2$: 8.44
at least one or more addimetal Fluorides selected from the class consisting of Li, Si, K, Sr 1.35
Mg: 1.19
Al: 1.54
Mn: 0.45
Ni: 0.75
Zr: 0.12
Cr: 0.16
Fe: Balance 8. An electric arc welding electrode comprised of a tube of steel having the following ingredients in the core thereof (in weight percent of total electrode weight):
$Fe_2O_3$: 3.52
SrO: 1.34
$BaF_2$: 10.02
at least one or more additional metal fluorides selected from the class consisting of Li, Si, K, Sr 1.68
Mg: 1.38
Al: 1.70
Ti: 0.10
Mn: 0.47
Ni: 0.58
Cr: 0.10
Fe: Balance

* * * * *

UNITED STATES PATENT AND TRADEMARK OFFICE
CERTIFICATE OF CORRECTION

PATENT NO. : 4,717,536
DATED : January 5, 1988
INVENTOR(S) : Chang-Shun Chai; Jon McCollister It is certified that error appears in the above-identified patent and that said Letters Patent are hereby corrected as shown below:

Title Page, Item [54], in the Title, after "BEAD" insert a comma (,); Item[57], in the Abstract paragraph, line 5, "chromiumwith" should read --- chromium with ---. Column 3, line 63 "(2777°F.)"should read --- (2795°F) ---. Column 6, line 48, after "analysis" insert --- which ---; line 68, "(79°C.)" should read --- (93°C.) ---. Column 7, line 2, "(79°C.)" should read --- (93°C.) ---. Column 9, line 38, "Nitorgen" should read --- Nitrogen ---; line 49, "0 30" should read --- 0.30 ---; line 50, "nor" should read --- not ---. Column 10, line 20, after "in" insert --- the ---.

Signed and Sealed this

Eleventh Day of April, 1989

Attest:

DONALD J. QUIGG

Attesting Officer        Commissioner of Patents and Trademarks